United States Patent
Nyland et al.

(10) Patent No.: US 8,086,806 B2
(45) Date of Patent: Dec. 27, 2011

(54) SYSTEMS AND METHODS FOR COALESCING MEMORY ACCESSES OF PARALLEL THREADS

(75) Inventors: Lars Nyland, Carrboro, NC (US); John R. Nickolls, Los Altos, CA (US); Gentaro Hirota, Sunnyvale, CA (US); Tanmoy Mandal, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 610 days.

(21) Appl. No.: 12/054,330

(22) Filed: Mar. 24, 2008

(65) Prior Publication Data

US 2009/0240895 A1    Sep. 24, 2009

(51) Int. Cl.
*G06F 12/00* (2006.01)
(52) U.S. Cl. .......... 711/154; 711/E12.014; 711/E12.078
(58) Field of Classification Search .................. None
See application file for complete search history.

(56) References Cited

U.S. PATENT DOCUMENTS

| | | | |
|---|---|---|---|
| 5,051,889 A | 9/1991 | Fung et al. | |
| 5,754,791 A | 5/1998 | Dahlgren et al. | |
| 5,809,534 A | 9/1998 | Elkhoury | |
| 7,492,368 B1 * | 2/2009 | Nordquist et al. | 345/502 |
| 2003/0074504 A1 | 4/2003 | Weber | |
| 2005/0047439 A1 * | 3/2005 | Madajczak | 370/469 |
| 2005/0066150 A1 * | 3/2005 | Mehta | 712/205 |
| 2005/0140685 A1 | 6/2005 | Garg | |
| 2005/0223163 A1 | 10/2005 | Ogasawara et al. | |
| 2007/0050564 A1 | 3/2007 | Gunna et al. | |
| 2008/0005207 A1 * | 1/2008 | Kumazawa et al. | 707/205 |

FOREIGN PATENT DOCUMENTS

| | | |
|---|---|---|
| DE | 10313645 | 10/2004 |
| GB | 2348976 | 10/2000 |
| WO | WO 2008/127610 | 10/2008 |
| WO | WO 2008/127622 | 10/2008 |
| WO | WO 2008/127623 | 10/2008 |

OTHER PUBLICATIONS

Combined Search and Examination Report, GB App. No. 0903708.6, Jun. 8, 2009 (provided as explanation of relevance of GB2348976 and DE10313645).

(Continued)

*Primary Examiner* — Reginald Bragdon
*Assistant Examiner* — Aracelis Ruiz
(74) *Attorney, Agent, or Firm* — Patterson & Sheridan, LLP (57) ABSTRACT

One embodiment of the present invention sets forth a technique for efficiently and flexibly performing coalesced memory accesses for a thread group. For each read application request that services a thread group, the core interface generates one pending request table (PRT) entry and one or more memory access requests. The core interface determines the number of memory access requests and the size of each memory access request based on the spread of the memory access addresses in the application request. Each memory access request specifies the particular threads that the memory access request services. The PRT entry tracks the number of pending memory access requests. As the memory interface completes each memory access request, the core interface uses information in the memory access request and the corresponding PRT entry to route the returned data. When all the memory access requests associated with a particular PRT entry are complete, the core interface satisfies the corresponding application request and frees the PRT entry.

23 Claims, 7 Drawing Sheets

OTHER PUBLICATIONS

Moss, et al. "Toward Acceleration of RSA Using 3D Graphics Hardware," LNCS 4887, Dec. 2007, pp. 369-388.
Translated Examination Report, German Patent App. No. 102009012409.8, received Feb. 3, 2010.
Eggers, et al., "Simultaneous Multithreading: A Platform for Next-Generation Processors," *IEEE Micro*, vol. 17, No. 5, pp. 12-19, Sep./Oct. 1997.
German Patent & Trademark Office Action, Ser. No. 10 2009 012 409.8-53 D1 dated Mar. 14, 2011.

* cited by examiner

SYSTEMS AND METHODS FOR COALESCING MEMORY ACCESSES OF PARALLEL THREADS

BACKGROUND OF THE INVENTION

1. Field of the Invention

Embodiments of the present invention relate generally to parallel processing and more specifically to systems and methods for coalescing memory accesses of parallel threads.

2. Description of the Related Art

A typical parallel processing subsystem is capable of very high performance using a relatively large number of small, parallel execution threads on dedicated programmable hardware processing units. The specialized design of such parallel processing subsystems usually allows these subsystems to efficiently perform certain tasks, such as rendering 3-D scenes or computing the product of two matrices, using a high volume of concurrent computational and memory operations. Each thread typically performs a portion of the overall task that the parallel processing subsystem is configured to perform and accesses specific memory addresses.

As is well-known, to perform highly-efficient coalesced memory transfers, parallel processing subsystems often require memory read or write operations to consist of large, contiguous blocks of memory on aligned block boundaries. More specifically, if a particular thread group (i.e., a group of parallel threads) accesses a block of memory that is aligned to a multiple of the memory fetch size, and each of the threads in the thread group accesses a sequential portion of the block, then the parallel processing subsystem may perform a single coalesced memory transfer. However, if a particular thread group does not conform to these requirements, then the parallel processing subsystem will perform a non-coalesced memory transfer for each individual thread in the thread group. For example, suppose that a thread group of sixteen parallel threads accesses a contiguous block of memory, but the block is shifted by one byte from a multiple of the memory fetch size. The parallel processing subsystem will typically perform sixteen non-coalesced memory transfers, each of which satisfies a specific thread. Performing sixteen non-coalesced memory transfers is far less efficient than performing a coalesced memory transfer and, therefore, substantially reduces the overall performance of the executing application program.

In one approach to addressing the problem, an application developer may take into consideration the memory fetch size and write an optimized application program that enables coalesced memory transfers wherever possible. One drawback to this approach is that developing such an optimized application program involves a complicated programming environment and is time-consuming for the application developer.

As the foregoing illustrates, what is needed in the art is a technique for more efficiently and flexibly performing memory accesses for thread groups.

SUMMARY OF THE INVENTION

One embodiment of the present invention sets forth a method for generating a coalesced memory access operation for a thread group based on an application request. The method includes the steps of receiving a memory access request from the application to be carried out by a plurality of active threads in the thread group, selecting an available entry in a pending request table (PRT) for the memory access request from the application, generating a first memory access request for a first active thread having a maximum size that defines a first memory region for the first memory access request, identifying one or more additional active threads that have associated memory access addresses located within the first memory region, and setting a thread mask to specify that the first active thread and the one or more additional active threads carry out the first memory access request.

One advantage of the disclosed technique is that the core interface optimizes the efficiency of memory accesses for each thread group and, consequently, the performance of a parallel processing subsystem increases. More specifically, these techniques enable the parallel processing subsystem to execute high-efficiency coalesced memory accesses for thread groups that do not access large contiguous blocks on aligned block boundaries.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
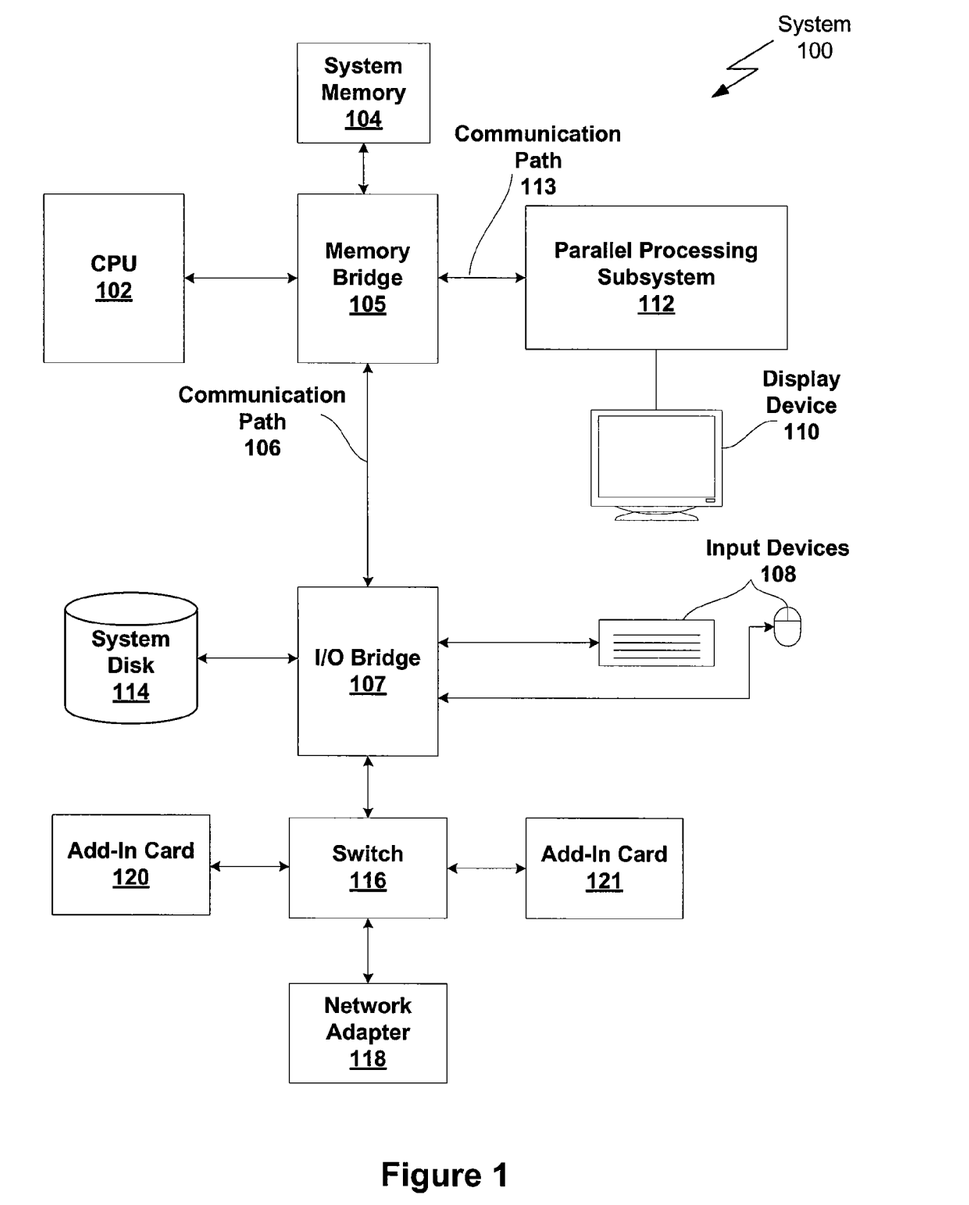
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via a bus path that includes a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108

(e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

Figure 2:
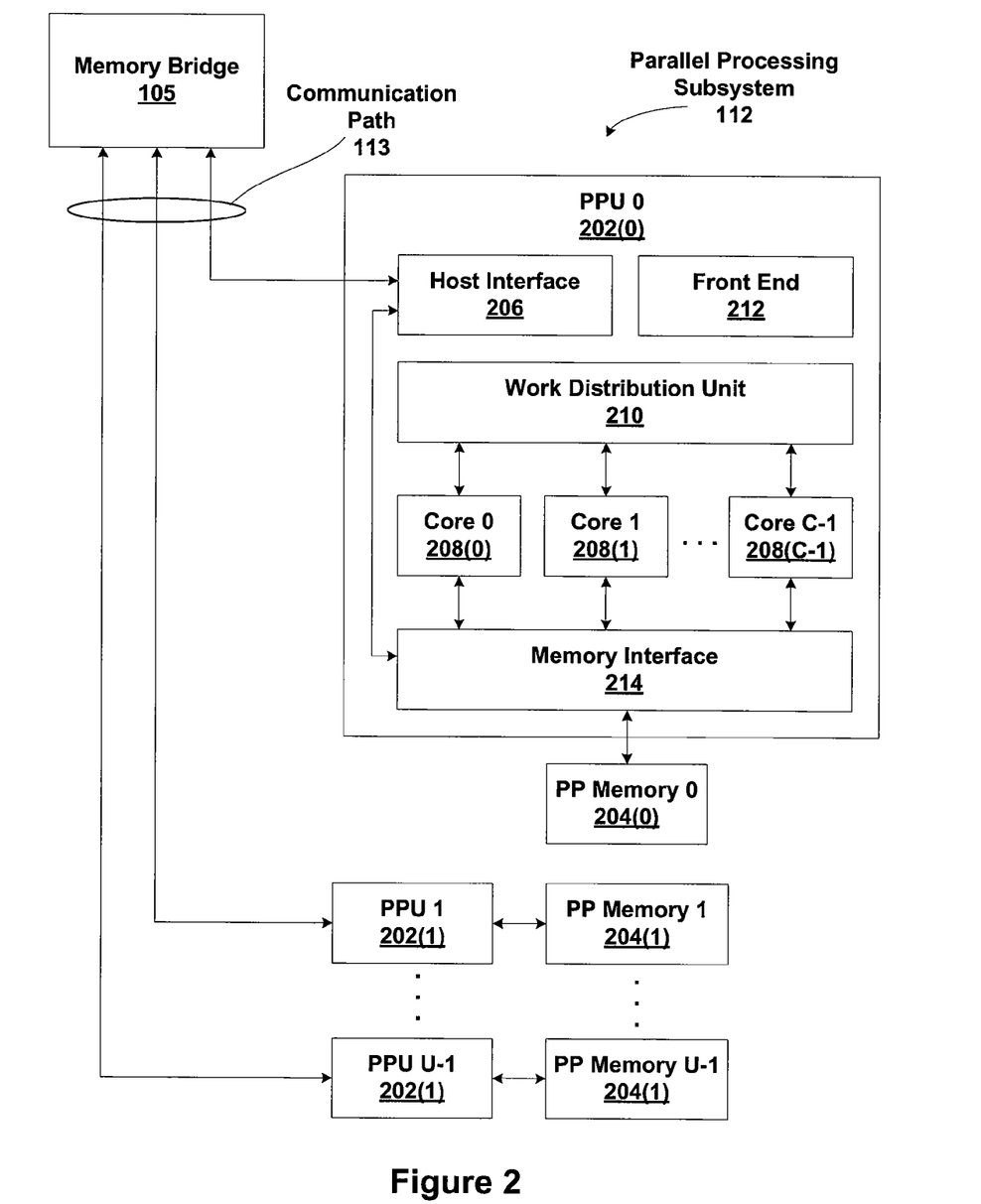
FIG. 2 illustrates a parallel processing subsystem, according to one embodiment of the invention.

FIG. 2 illustrates a parallel processing subsystem 112, according to one embodiment of the invention. Parallel processing subsystem 112 includes one or more parallel processing units (PPUs) 202, each of which is coupled to a local parallel processing (PP) memory 204. In general, a parallel processing subsystem includes a number U of PPUs, where $U \geq 1$. (Herein, multiple instances of like objects are denoted with reference numbers identifying the object and parenthetical numbers identifying the instance where needed.) PPUs 202 and PP memories 204 may be implemented, e.g., using one or more integrated circuit devices such as programmable processors, application specific integrated circuits (ASICs), and memory devices.

As shown in detail for PPU 202(0), each PPU 202 includes a host interface 206 that communicates with the rest of system 100 via communication path 113, which connects to memory bridge 105 (or, in one alternative embodiment, directly to CPU 102). In one embodiment, communication path 113 is a PCI-E link, in which dedicated lanes are allocated to each PPU 202 as is known in the art. Other communication paths may also be used. Host interface 206 generates packets (or other signals) for transmission on communication path 113 and also receives all incoming packets (or other signals) from communication path 113 and directs them to appropriate components of PPU 202. For example, commands related to processing tasks may be directed to a front end unit 212 while commands related to memory operations (e.g., reading from or writing to PP memory 204) may be directed to a memory interface 214. Host interface 206, front end unit 212, and memory interface 214 may be of generally conventional design, and a detailed description is omitted as not being critical to the present invention.

Each PPU 202 advantageously implements a highly parallel processor. As shown in detail for PPU 202(0), a PPU 202 includes a number C of cores 208, where $C \geq 1$. Each processing core 208 is capable of executing a large number (e.g., tens or hundreds) of threads concurrently, where each thread is an instance of a program; one embodiment of a multithreaded processing core 208 is described below. Cores 208 receive processing tasks to be executed via a work distribution unit 210, which receives commands defining processing tasks from a front end unit 212. Work distribution unit 210 can implement a variety of algorithms for distributing work. For instance, in one embodiment, work distribution unit 210 receives a "ready" signal from each core 208 indicating whether that core has sufficient resources to accept a new processing task. When a new processing task arrives, work distribution unit 210 assigns the task to a core 208 that is asserting the ready signal; if no core 208 is asserting the ready signal, work distribution unit 210 holds the new processing task until a ready signal is asserted by a core 208. Those skilled in the art will recognize that other algorithms may also be used and that the particular manner in which work distribution unit 210 distributes incoming processing tasks is not critical to the present invention.

Cores 208 communicate with memory interface 214 to read from or write to various external memory devices. In one embodiment, memory interface 214 includes an interface adapted to communicate with local PP memory 204, as well as a connection to host interface 206, thereby enabling the cores to communicate with system memory 104 or other memory that is not local to PPU 202. Memory interface 214 can be of generally conventional design, and a detailed description is omitted.

Cores 208 can be programmed to execute processing tasks relating to a wide variety of applications, including but not limited to linear and nonlinear data transforms, filtering of video and/or audio data, modeling operations (e.g., applying laws of physics to determine position, velocity and other attributes of objects), image rendering operations (e.g., vertex shader, geometry shader, and/or pixel shader programs), and so on. PPUs 202 may transfer data from system memory 104 and/or local PP memories 204 into internal (on-chip) memory, process the data, and write result data back to system memory 104 and/or local PP memories 204, where such data can be accessed by other system components, including, e.g., CPU 102 or another parallel processing subsystem 112.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local PP memory 204 (which can be used as graphics memory including, e.g., a conventional frame buffer) to store and update pixel data, delivering pixel data to display device 110, and the like. In some embodiments, PP subsystem 112 may include one or more PPUs 202 that operate as graphics processors and one or more other PPUs 202 that are used for general-purpose computations. The PPUs may be identical or different, and each PPU may have its own dedicated PP memory device(s) or no dedicated PP memory device(s).

In operation, CPU 102 is the master processor of system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in FIG. 1), which may be located in system memory 104, PP memory 204, or another storage location accessible to both CPU 102 and PPU 202.

PPU 202 reads the command stream from the pushbuffer and executes commands asynchronously with operation of CPU 102.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

The connection of PPU 202 to the rest of system 100 may also be varied. In some embodiments, PP system 112 is implemented as an add-in card that can be inserted into an expansion slot of system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

A PPU may be provided with any amount of local PP memory, including no local memory, and may use local memory and system memory in any combination. For instance, a PPU 202 can be a graphics processor in a unified memory architecture (UMA) embodiment; in such embodiments, little or no dedicated graphics (PP) memory is provided, and PPU 202 would use system memory exclusively or almost exclusively. In UMA embodiments, a PPU may be integrated into a bridge chip or processor chip or provided as a discrete chip with a high-speed link (e.g., PCI-E) connecting the PPU to system memory, e.g., via a bridge chip.

As noted above, any number of PPUs can be included in a parallel processing subsystem. For instance, multiple PPUs can be provided on a single add-in card, or multiple add-in cards can be connected to communication path 113, or one or more of the PPUs could be integrated into a bridge chip. The PPUs in a multi-PPU system may be identical to or different from each other; for instance, different PPUs might have different numbers of cores, different amounts of local PP memory, and so on. Where multiple PPUs are present, they may be operated in parallel to process data at higher throughput than is possible with a single PPU.

Systems incorporating one or more PPUs may be implemented in a variety of configurations and form factors, including desktop, laptop, or handheld personal computers, servers, workstations, game consoles, embedded systems, and so on.

Core Overview

Figure 3:
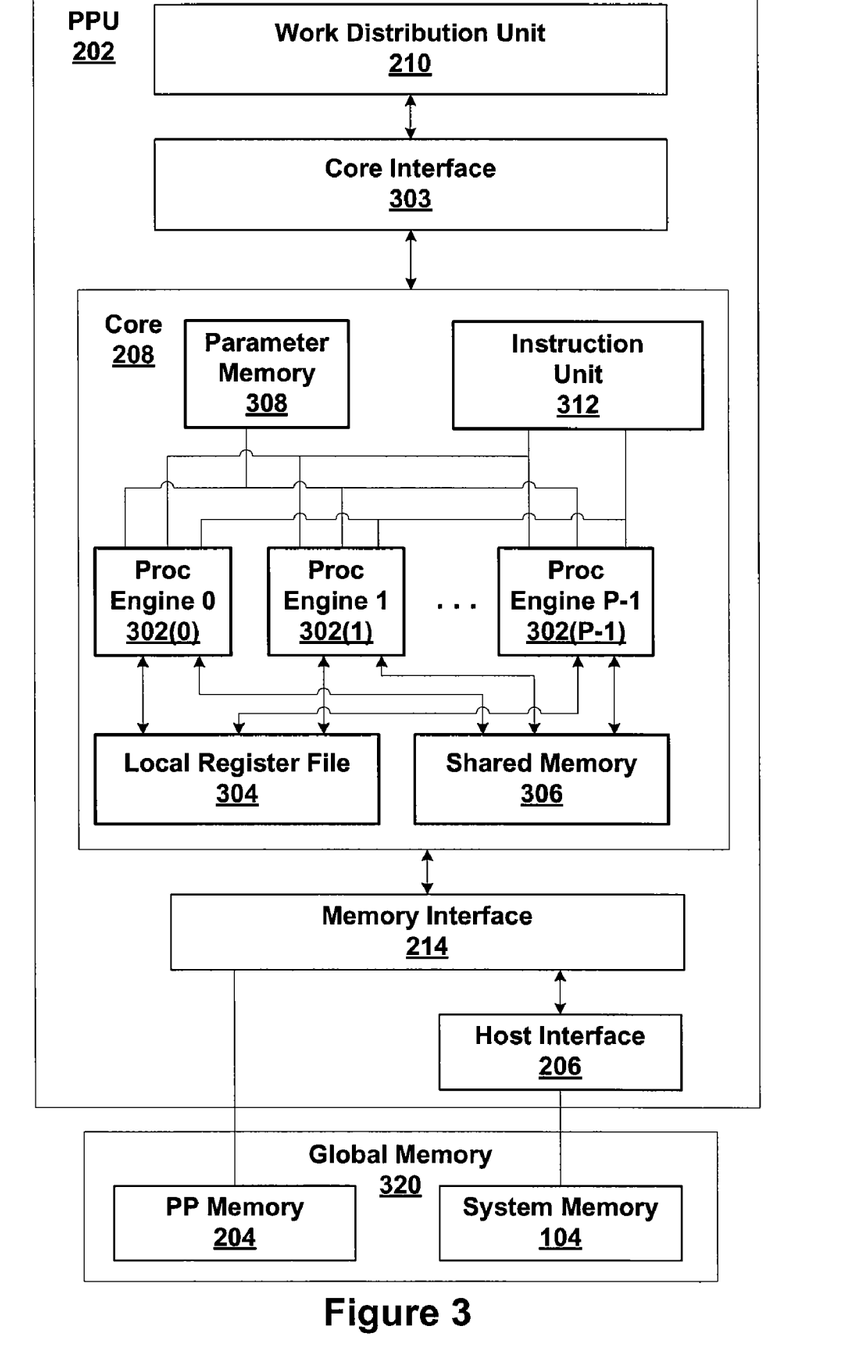
FIG. 3 is a block diagram of a parallel processing unit for the parallel processing subsystem of FIG. 2, in accordance with one or more aspects of the present invention.

FIG. 3 is a block diagram of a parallel processing unit 220 for the parallel processing subsystem 112 of FIG. 2, in accordance with one or more aspects of the present invention. PPU 202 includes a core 208 (or multiple cores 208) configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction multiple-thread (SIMT) techniques are used to support parallel execution of a large number of generally synchronized threads, using a common instruction unit configured to issue instructions to a set of processing engines. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

In a way similar to a SIMD machine, a SIMT parallel processing core 208 executes instances of a single parallel program on different data across a plurality of parallel processing engines 302 included in the core 208. Thus, for example, the core 208 may be configured to execute a series of common instructions on the parallel processing engines 302 within the core 208. The series of instructions to a single parallel processing engine 302 constitutes a thread, as defined previously, and the collection of a certain number of concurrently executing threads among the parallel processing engines 302 within a core 208 is referred to herein as a "warp" or "thread group." Additionally, a plurality of related thread groups may be active (in different phases of execution) at the same time on a core 208. This collection of thread groups is referred to herein as a "cooperative thread array" ("CTA").

The size of a particular CTA is equal to m*k, where k is the number of concurrently executing threads in a thread group and is typically an integer multiple of the number of parallel processing engines 302 in a core 208, and m is the number of thread groups simultaneously active on the core 208. The size of a CTA is generally determined by the programmer and the amount of hardware resources, such as memory or registers, available to the CTA.

In one embodiment, each core 208 includes an array of P (e.g., 8, 16, etc.) parallel processing engines 302 configured to receive SIMT instructions from a single instruction unit 312. Each processing engine 302 advantageously includes an identical set of functional units (e.g., arithmetic logic units, etc.). The functional units may be pipelined, allowing a new instruction to be issued before a previous instruction has finished, as is known in the art. Any combination of functional units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

Each processing engine 302 uses space in a local register file (LRF) 304 for storing its local input data, intermediate results, and the like. In one embodiment, local register file 304 is physically or logically divided into P lanes, each having some number of entries (where each entry might store, e.g., a 32-bit word). One lane is assigned to each processing engine 302, and corresponding entries in different lanes can be populated with data for different threads executing the same program to facilitate SIMT execution. In some embodiments, each processing engine 302 can only access LRF entries in the lane assigned to it. The total number of entries in local register file 304 is advantageously large enough to support multiple concurrent threads per processing engine 302.

Each processing engine 302 also has access to an on-chip shared memory 306 that is shared among all of the processing engines 302 in core 208. Shared memory 306 may be as large as desired, and in some embodiments, any processing engine 302 can read to or write from any location in shared memory 306 with equally low latency (e.g., comparable to accessing local register file 304). In some embodiments, shared memory 306 is implemented as a shared register file; in other embodiments, shared memory 306 can be implemented using shared cache memory.

In addition to shared memory 306, some embodiments also provide additional on-chip parameter memory and/or cache(s) 308, which may be implemented, e.g., as a conventional RAM or cache. Parameter memory/cache 308 can be used, e.g., to hold state parameters and/or other data (e.g., various constants) that may be needed by multiple threads. Processing engines 302 also have access via memory interface 214 to off-chip "global" memory 320, which can include, e.g., PP memory 204 and/or system memory 104, with system memory 104 being accessible by memory interface 214 via host interface 206 as described above. It is to be understood that any memory external to PPU 202 may be used as global memory 320. Processing engines 302 can be coupled to memory interface 214 via an interconnect (not explicitly shown) that allows any processing engine 302 to access global memory 320.

In one embodiment, each processing engine 302 is multi-threaded and can execute up to some number G (e.g., 24) of threads concurrently, e.g., by maintaining current state information associated with each thread in a different portion of its assigned lane in local register file 304. Processing engines 302 are advantageously designed to switch rapidly from one thread to another so that instructions from different threads can be issued in any sequence without loss of efficiency.

Instruction unit 312 is configured such that, for any given processing cycle, the same instruction (INSTR) may be issued to all P processing engines 302. Thus, at the level of a single clock cycle, core 208 implements a microarchitecture substantially representing a P-way SIMT or SIMD design. Since each processing engine 302 is also multithreaded, supporting up to G threads concurrently, core 208 in this embodiment can have up to P*G threads executing concurrently. For instance, if P=16 and G=24, then core 208 supports up to 384 concurrent threads.

Because instruction unit 312 may issue the same instruction to all P processing engines 302 in parallel, core 208 is advantageously used to process threads in "SIMT thread groups." As used herein, a "SIMT thread group" or "warp" refers to a group of up to P threads of execution of the same program on different input data, with one thread of the group being assigned to each processing engine 302. A SIMT thread group may include fewer than P threads, in which case some of processing engines 302 will be idle during cycles when that SIMT thread group is being processed. A SIMT thread group may also include more than P threads, in which case processing will take place over consecutive clock cycles. Since each processing engine 302 can support up to G threads concurrently, it follows that up to G SIMT thread groups can be executing in core 208 at any given time.

On each clock cycle, one instruction is issued to all P threads making up a selected one of the G SIMT thread groups. To indicate which thread group is currently active, a warp identifier for the associated warp or thread group may be included with the instruction. Processing engine 302 uses the warp identifier as a context identifier, e.g., to determine which portion of its assigned lane in local register file 304 should be used when executing the instruction. Thus, in a given cycle, all processing engines 302 in core 208 are nominally executing the same instruction for different threads in the same SIMT thread group. In some instances, some threads in a SIMT thread group may be temporarily idle, e.g., due to conditional or predicated instructions, divergence at branches in the program, or the like.

Operation of core 208 is advantageously controlled via a core interface 303. In some embodiments, core interface 303 receives data to be processed (e.g., primitive data, vertex data, and/or pixel data) as well as state parameters and commands defining how the data is to be processed (e.g., what program is to be executed) from work distribution unit 210. Core interface 303 can load data to be processed into shared memory 306 and parameters into parameter memory 308. Core interface 303 also initializes each new thread or SIMT thread group in instruction unit 312, then signals instruction unit 312 to begin executing the threads. When execution of a thread or SIMT thread group is completed, core 208 advantageously notifies core interface 303. Core interface 303 can then initiate other processes, e.g., to retrieve output data from shared memory 306 and/or to prepare core 208 for execution of additional threads or SIMT thread groups.

It will be appreciated that the core architecture described in FIGS. 1, 2 and 3 is illustrative and that variations and modifications of this architecture fall within the scope of the present invention. For example, any number of processing engines may be included in each core 208. In some embodiments, each processing engine has its own local register file, and the allocation of local register file entries per thread can be fixed or configurable as desired. Further, while only one core 208 is shown, a PPU 202 may include any number of cores 208, which are advantageously of identical design to each other so that execution behavior does not depend on which core 208 receives a particular processing task. Each core 208 advantageously operates independently of other cores 208 and has its own processing engines, shared memory, and so on.

Persons skilled in the art will understand that the architecture described in FIGS. 1, 2 and 3 in no way limits the scope of the present invention and that the techniques taught herein may be implemented on any properly configured processing unit, including, without limitation, one or more CPUs, one or more multi-core CPUs, one or more GPUs, one or more multi-core GPUs, or the like, without departing the scope of the present invention.

Thread Arrays and Cooperative Thread Arrays

In some embodiments, multithreaded processing core 208 of FIG. 3 can execute general-purpose computations using thread blocks or thread arrays. A thread array consists of a number (n0) of threads that concurrently execute the same program on an input data set to produce an output data set. Each thread in the thread array is assigned a unique thread identifier ("thread ID") that is accessible to the thread during its execution. The thread ID controls various aspects of the thread's processing behavior. For instance, a thread ID may be used to determine which portion of the input data set a thread is to process and/or to determine which portion of an output data set a thread is to produce or write.

In some embodiments, the thread arrays are arranged as "cooperative thread arrays," or CTAs. Each CTA is a set of threads that concurrently execute the same program (referred to herein as a "CTA program") on an input data set to produce an output data set. In a CTA, the threads can cooperate by sharing data with each other in a manner that depends on thread ID. For instance, in a CTA, data can be produced by one thread and consumed by another. In some embodiments, synchronization instructions can be inserted into the CTA program code at points where data is to be shared to ensure that the data has actually been produced by the producing thread before the consuming thread attempts to access it. The extent, if any, of data sharing among threads of a CTA is determined by the CTA program; thus, it is to be understood that in a particular application that uses CTAs, the threads of a CTA might or might not actually share data with each other, depending on the CTA program.

In some embodiments, threads in a CTA share input data and/or intermediate results with other threads in the same CTA using shared memory 306 of FIG. 3. For example, a CTA program might include an instruction to compute an address in shared memory 306 to which particular data is to be written, with the address being a function of thread ID. Each thread computes the function using its own thread ID and writes to the corresponding location. The address function is advantageously defined such that different threads write to different locations; as long as the function is deterministic, the location written to by any thread is predictable. The CTA program can also include an instruction to compute an address in shared memory 306 from which data is to be read, with the address being a function of thread ID. By defining suitable functions and providing synchronization techniques, data can be written to a given location in shared memory 306 by one thread of a CTA and read from that location by a different thread of the same CTA in a predictable manner. Consequently, any desired pattern of data sharing among threads can be supported, and any thread in a CTA can share data with any other thread in the same CTA.

CTAs (or other types of thread groups) are advantageously employed to perform computations that lend themselves to a data-parallel decomposition. As used herein, a "data-parallel decomposition" includes any situation in which a computational problem is solved by executing the same algorithm multiple times in parallel on input data to generate output data; for instance, one common instance of data-parallel decomposition involves applying the same processing algorithm to different portions of an input data set in order to generate different portions an output data set. Examples of problems amenable to data-parallel decomposition include matrix algebra, linear and/or nonlinear transforms in any number of dimensions (e.g., Fast Fourier Transforms), and various filtering algorithms including convolution filters in any number of dimensions, separable filters in multiple dimensions, and so on. The processing algorithm to be applied to each portion of the input data set is specified in the CTA program, and each thread in a CTA executes the same CTA program on one portion of the input data set or produces one portion of the output data set. A CTA program can implement algorithms using a wide range of mathematical and logical operations, and the program can include conditional or branching execution paths and direct and/or indirect memory access.

For example, as is known in the art, an array of data values (e.g., pixels) can be filtered using a 2-D kernel-based filter algorithm, in which the filtered value of each pixel is determined based on the pixel and its neighbors. In some instances the filter is separable and can be implemented by computing a first pass along the rows of the array to produce an intermediate array, then computing a second pass along the columns of the intermediate array. In one CTA implementation of a separable 2-D filter, the threads of the CTA load the input data set (or a portion thereof) into shared memory 306, then synchronize. Each thread performs the row-filter for one point of the data set and writes the intermediate result to shared memory 306. After all threads have written their row-filter results to shared memory 306 and have synchronized at that point, each thread performs the column filter for one point of the data set. In the course of performing the column filter, each thread reads the appropriate row-filter results from shared memory 306, and a thread may read row-filter results that were written by any thread of the CTA. The threads write their column-filter results to shared memory 306. The resulting data array can be stored to global memory or retained in shared memory 306 for further processing. Where shared memory 306 can be accessed with lower latency and/or greater bandwidth than global memory, storing intermediate results in shared memory 306 advantageously improves processor throughput.

In one embodiment, a driver program executing on CPU 102 of FIG. 1 writes commands defining the CTA to a pushbuffer (not explicitly shown) in memory (e.g., system memory 104), from which the commands are read by a PPU 202. The commands advantageously are associated with state parameters such as the number of threads in the CTA, the location in global memory 320 of an input data set to be processed using the CTA, the location in global memory 320 of the CTA program to be executed, and the location in global memory 320 where output data is to be written. The state parameters may be written to the pushbuffer together with the commands. In response to the commands, core interface 303 loads the state parameters into core 208 (e.g., into parameter memory 308), then begins launching threads until the number of threads specified in the CTA parameters have been launched. In one embodiment, core interface 303 assigns thread IDs sequentially to threads as they are launched. More generally, since all threads in a CTA execute the same program in the same core 208, any thread can be assigned any thread ID, as long as each valid thread ID is assigned to only one thread. Any unique identifier (including but not limited to numeric identifiers) can be used as a thread ID. In one embodiment, if a CTA includes some number ($n_0$) of threads, thread IDs are simply sequential (one-dimensional) index values from 0 to $n_0-1$. In other embodiments, multidimensional indexing schemes can be used. It should be noted that as long as data sharing is controlled by reference to thread IDs, the particular assignment of threads to processing engines will not affect the result of the CTA execution. Thus, a CTA program can be independent of the particular hardware on which it is to be executed.

Coalescing Memory Accesses for a Thread Group

Figure 4:
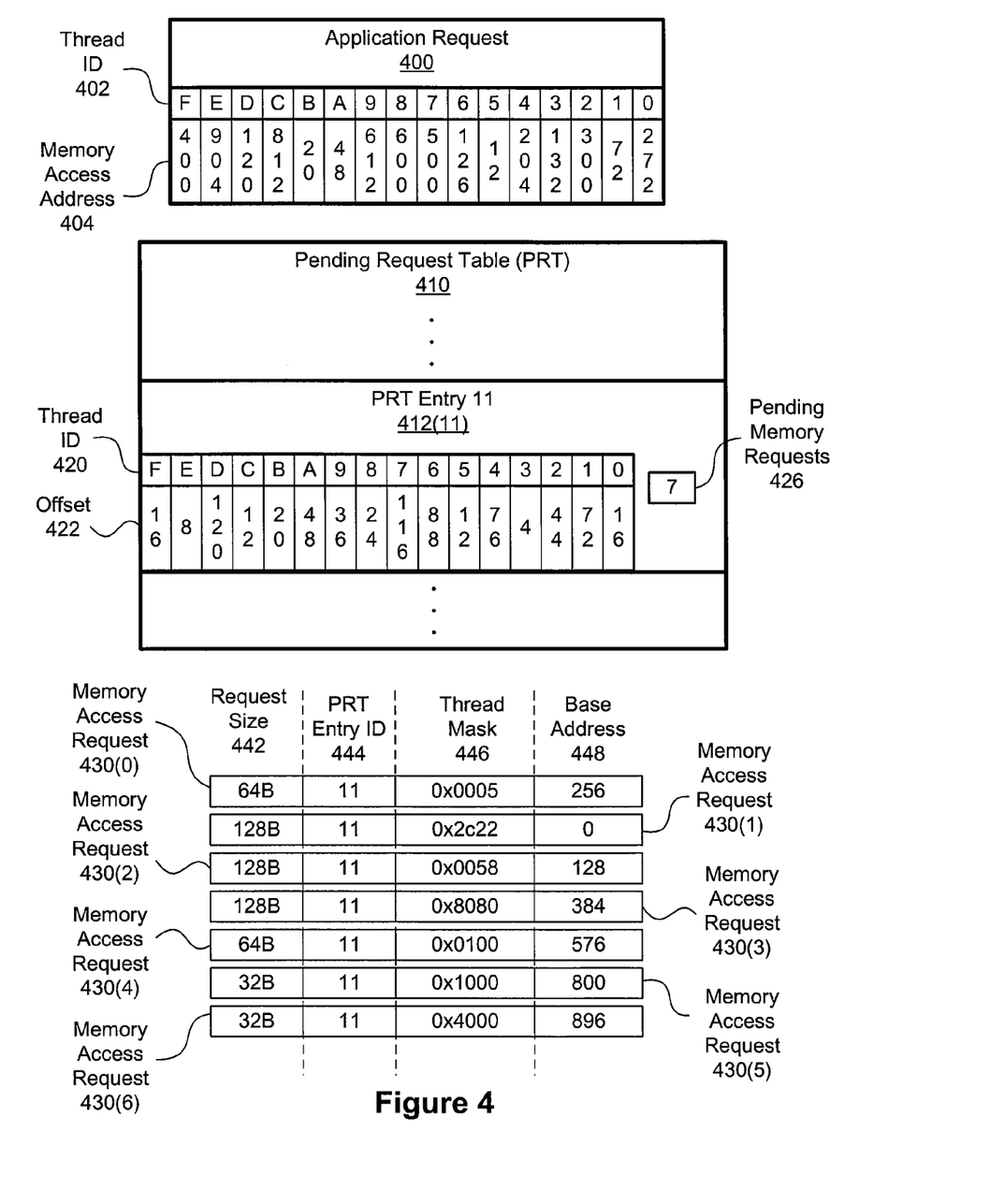
FIG. 4 is a conceptual diagram of an exemplary application request, a pending request table, and memory access requests that enable the coalescing of memory accesses, according to one embodiment of the invention.

FIG. 4 is a conceptual diagram of an exemplary application request 400, a pending request table 410, and memory access requests 430 that enable the coalescing of memory accesses, according to one embodiment of the invention. The configuration and capabilities of the system 100 of FIG. 1 determine a memory fetch size, a maximum memory request size, and a minimum memory request size. In the example shown in FIG. 4, the memory fetch size is 128B. The maximum memory request size (i.e., the maximum-sized memory block that the core interface 303 may request from the memory interface 214) is 128B. And, the minimum memory request size (i.e., the minimum-sized memory block that the core interface 303 may request from the memory interface 214) is 32B. In alternate embodiments, the memory fetch size may be smaller or larger than 128B, the maximum memory request size may be smaller or larger than 128B, and the minimum memory request size may be smaller or larger than 32B.

The application request 400 is initiated by an application program and received by the core interface 303. The application request 400 represents the execution of a memory instruction by a thread group. In the example shown in FIG. 4, the application request 400 is for a group of 16 threads with thread IDs 0 through F. Thus the application request specifies 16 memory addresses to access. The invention coalesces (combines) multiple accesses to addresses in the same memory block into one memory access request per block. As is well known, a load memory instruction reads data from memory at a specified address, a store memory instruction writes data to memory at a specified address, and an atomic instruction both reads and writes memory at a specified address. Each thread in the thread group includes a thread ID 402 and a memory access address 404. While executing the threads, the core interface 303 may read data using the memory interface 214, write data using the memory interface 214, or any combination thereof in order to execute a particular memory instruction. For example, while executing a thread corresponding to a particular thread ID 402, the core interface 303 may read data from the corresponding memory access address 404 or write data to the corresponding memory access address 404. Alternatively, while executing a thread corresponding to a particular thread ID 402, the core interface 303 may read data from the corresponding memory access address 404, modify the data, and write the modified data to the corresponding memory access address 404.

The pending request table 410 includes one or more pending request table entries 412. Upon receiving the application request 400, the core interface 303 identifies an available pending request table entry 412 in the pending request table 410. Subsequently, the core interface 303 modifies the available pending request table entry 412 to represent the application request 400. Each pending request table entry 412 represents a single application request 400. Reciprocally, each application request 400 is represented by a single pending request table entry 412. While processing a particular application request 400, the core interface 303 generates one or more memory access requests 430 and transmits these memory access requests 430 to the memory interface 214. Advantageously, the core interface 303 identifies and exploits any opportunities to generate memory access requests 430 that service two or more active threads in the thread group. Consequently, each memory access request 430 services one or more of the active threads included in the application request 400. However, each active thread included in the application request 400 is only serviced by a single memory access request 430.

In order to satisfy each application request 400, the core interface 303 assigns, tracks, and routes the data in the corresponding pending request table entry 412 and the corresponding memory access requests 430. As shown in detail for the pending request table entry 11, 412(11), each thread in the thread group includes a thread ID 420 and an offset 422. For each thread, the thread ID 420 in the pending request table entry 412 matches the thread ID 402 in the corresponding application request 400. Each pending request table entry 412 also includes a number of pending memory access requests 426. The pending memory access requests 426 tracks the number of memory access requests 430 associated with the pending request table entry 412 and, therefore, with the application request 400 that the core interface 303 has transmitted to the memory interface 214, but that the core interface 303 has not received back from the memory interface 214.

When the core interface 303 generates a memory access request 430 and transmits the memory access request 430 to the memory interface 214, the core interface 303 increments the pending memory access requests 426 in the corresponding PRT entry 412 by one. Each memory access request 430 includes a pending request table entry ID 444, a thread mask 446, a base address 448, and a request size 442. The pending table entry ID 444 associates the memory access request 430 to a specific pending request table entry 412. Further, the thread mask 446 defines the thread IDs 420 in the pending request table entry 412 and, therefore, the thread IDs 402 in the application request 400 that are serviced by the memory access request 430. When the core interface 303 receives a completed memory access request 430 from the memory interface 214, the core interface 303 decrements the number of pending memory access requests 426 by one.

Further, when the core interface 303 determines that the number of pending memory access requests 426 in a particular pending table request entry 412 is equal to zero, the core interface 303 satisfies the corresponding application request 400 and frees the particular pending table request entry 412. For example, as part of satisfying a particular application request 400, the core interface 303 may transmit assembled data corresponding to the application request 400 to the application program. After freeing the particular pending table request entry 412, the core interface 303 may modify the particular pending request table entry 412 to represent a different application request 400. The core interface 303 may store the pending request table 410 in any memory that the core interface 303 is configured to access. For example, the core interface 303 may store the pending request table 410 in the local register file 304 of FIG. 3. The core interface 303 may be configured to create the pending request table 410 to be of any size.

Again, to optimize the efficiency of memory accesses for the application request 400, the core interface 303 identifies and exploits any opportunities to generate memory access requests 430 that service two or more active threads in the thread group. In other words, the core interface 303 divides the active threads included in the application request 400 into one or more sets of threads that have proximally-located memory access addresses 404. More specifically, the core interface 303 partitions the active threads included in the application request 400 into non-overlapping memory regions based on the corresponding memory access addresses 404. Each memory region corresponds to a block of memory aligned to a multiple of the memory fetch size and equal to the size of the maximum memory access request. In the best case (i.e., when the memory access addresses 404 of all of the active threads are encompassed by a single memory region), the core interface generates one memory access request 430 for the application request 400. In the worst case (i.e., when the memory access address 404 of each active thread is encompassed by a different memory region), the core interface 303 generates a separate memory access request 430 for each of the active threads in the application request 400.

For example, the thread corresponding to the thread ID 0 has a memory access address 404 of 272B. Again, both the memory fetch size and the maximum memory request size in the example shown in FIG. 4 are 128B. Consequently, the memory access address 404 of the thread corresponding to the thread ID 0 is located within the memory region 256B-384B. The thread corresponding to the thread ID 2 has a memory access address 404 of 300B and is, therefore, located within the same memory region 256B-384B. No other thread in the application request 400 has a memory access address 404 that is located within the same memory region 256B-384B. Therefore, the core interface 303 groups the threads corresponding to the thread IDs 0 and 2 together into a single set of two threads.

The core interface 303 may divide the active threads into sets of threads in any technically feasible fashion. For example, the core interface 303 may identify the lowest numbered active thread based on the thread ID 402 and determine an associated memory region based on the memory access address 404 of the lowest numbered active thread. The core interface 303 may then generate a memory access request 430 associated with the lowest numbered active thread that defines this associated memory region. Subsequently, the core interface may examine the remaining active threads to determine whether any of the associated memory access addresses 404 are located within the memory region defined by the memory access request 430 associated with the lowest numbered active thread. After identifying all of the active threads that have associated memory access addresses 404 located within the memory region defined by the memory access request 430 associated with the lowest numbered active thread, the core interface 303 may modify the memory access request 430 associated with the lowest numbered active thread to service all of the identified threads. The core interface 303 may then mark all of the serviced threads as inactive. The core interface may repeat this process until each of the originally-active threads in the application request 400 is serviced by one of the memory access requests 430. For example, the application request 400 includes sixteen active threads and is serviced by seven memory access requests 430.

Again, after identifying a set of threads that have associated memory access addresses 404 located within a particular memory region, the core interface 303 generates a corresponding memory access request 430 that services the set of threads. In other words, the core interface 303 generates a particular memory access request 430 that is designed to configure the memory interface 214 to read and/or write data that includes the memory access addresses 404 corresponding to the identified set of threads. The core interface 303 sets the thread mask 446 to reflect the thread IDs 420 in the pending request table entry 412 that is serviced by the particular memory access request 430. Further, the core interface 303 sets the base address 448 included in the particular memory access request 430 to an address that is aligned to the memory fetch size. Initially, the core interface 303 sets the request size 442 to the maximum memory request size.

For each memory access request 430, to further optimize the efficiency of memory accesses, the core interface 303 evaluates the spread of the memory access addresses 404 within the memory region defined by the memory access request 430. If the core interface 303 determines that the memory access addresses 404 associated with all of the active threads that are represented by the memory access request 430 are located within either the lower half or the upper half of the memory region, then the core interface 303 halves the size of the memory region defined by the memory access request 430. The core interface 303 repeatedly halves the size of the memory region defined by the memory access request 430 until either the memory access addresses 404 associated with the active threads that are represented by the memory access request 430 span both halves of the memory access request 430 or until the minimum memory request size is reached. For example, the memory request 430(0) represents the threads corresponding to the thread IDs 0 and 2 and the 64B memory region 256B-320B. Similarly, the memory request 430(6) represents the thread corresponding to the thread ID E and the 32B memory region 896B-928B.

For each thread ID 420, the core interface 303 assigns the corresponding offset 422 in the pending request table entry 412 to facilitate the correct routing of the data associated with the memory access request 430 that satisfies the thread corresponding to the particular thread ID 420. For example, since the thread ID 0 has a memory access address 404 of 272B and is serviced by the memory access request 430(0) which has a base address 448 of 256B, the core interface 303 assigns an offset 422 of 16B (272B-256B) to the thread ID 0. Similarly, since the thread ID E has a memory access address 404 of 904B and is serviced by the memory access request 430(6) which has a base address 448 of 896B, the core interface 303 assigns an offset 422 of 8B (904B-896B) to the thread ID E.

The thread mask 446 and the offsets 422 enable the core interface 303 to correctly route both outgoing data (corresponding to application requests 400 that involve writing data) and incoming data (corresponding to application requests 400 that involve reading data). Advantageously, the offsets 422 facilitate the permutation of data within the thread group corresponding to a particular application request 400 without increasing the number of memory access requests 430 generated for the application request 400. For example, a group of threads with memory access addresses that represent a random distribution of bytes within the memory fetch size and that are aligned on a memory fetch boundary may be serviced by a single memory access request. The core interface 303 may accomplish the correct routing of the data in any technically feasible fashion. For example, as persons skilled in the art will recognize, a transpose buffer or a permutation network may be used to route the data appropriately. More specifically, suppose that the permutation network were implemented using crossbar hardware. To properly handle the data associated with a particular memory access request 430, the core interface 303 would setup the crossbar hardware for the threads designated by the thread mask 446 in the memory access request 430 using the corresponding offsets 422 in the pending table request entry 410 specified by the PRT entry ID 444 in the memory access request 430.

The core interface 303 may concurrently receive and process multiple application requests. Accordingly, the core interface 303 may generate concurrent memory access requests corresponding to multiple PRT entries, and the memory access requests corresponding to a particular PRT entry may be intermixed with the memory access requests corresponding to another PRT entry. Similarly, the core interface 303 may concurrently receive completed memory access requests from the memory interface 214. The core interface 303 may receive completed memory access requests corresponding to a particular PRT entry intermixed with completed memory access requests corresponding to another PRT entry. Again, the core interface 303 determines the correspondence between a particular PRT entry and a particular memory access request based on the PRT entry ID in the memory access request.

Figure 5A:
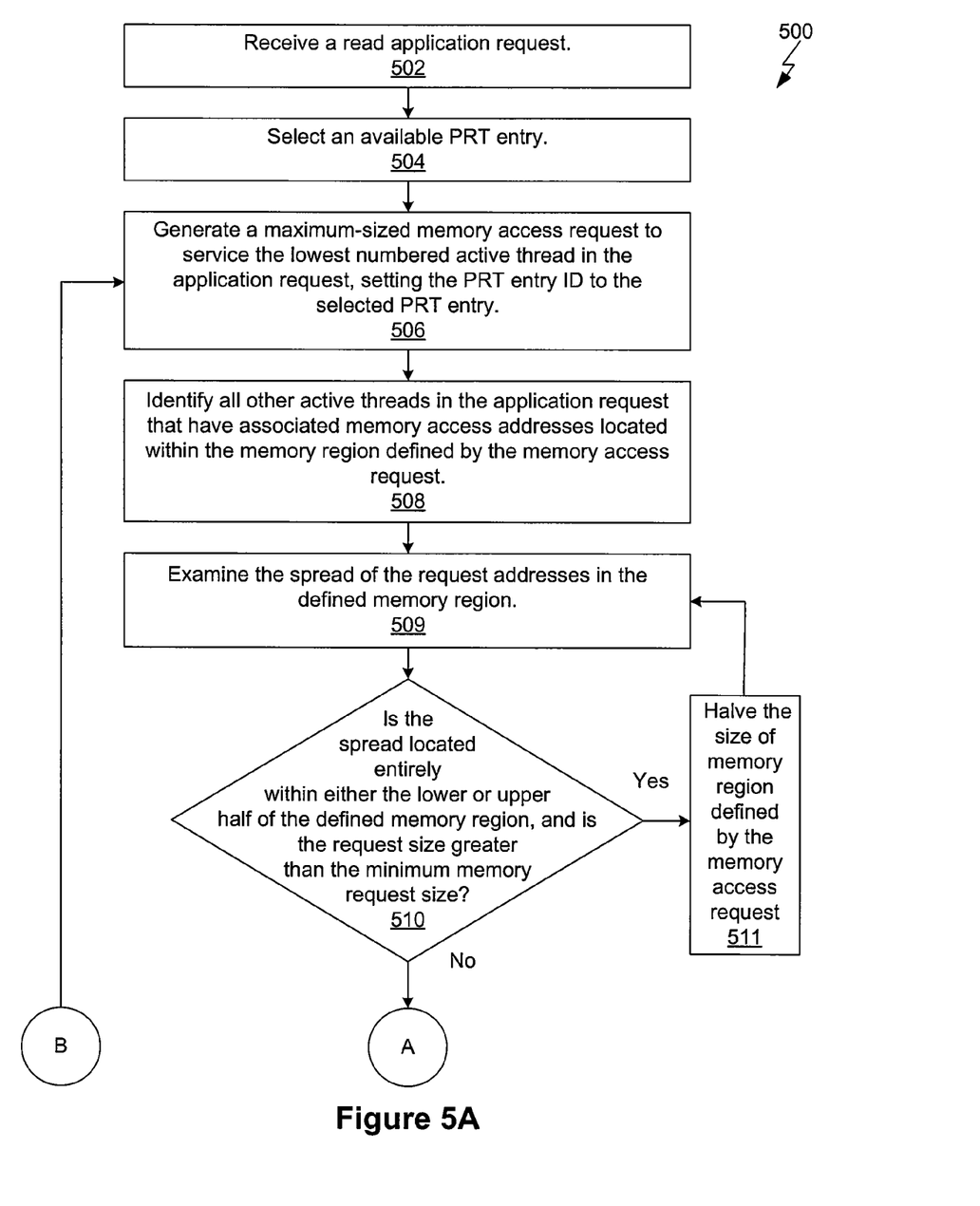
FIGS. 5A-5B are a flow diagram of method steps for generating coalesced memory access requests, according to one embodiment of the invention.
Figure 5B:
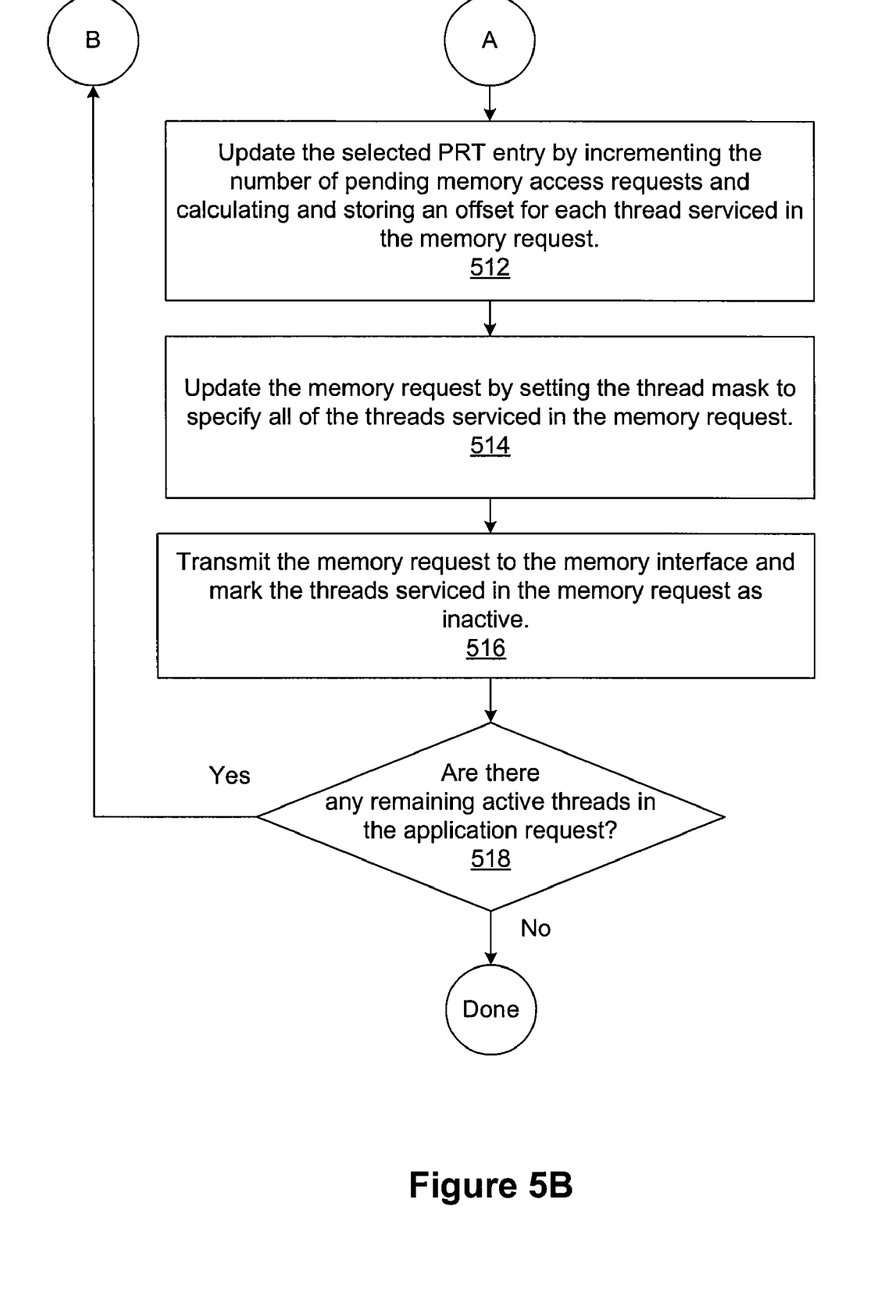

FIGS. 5A-5B are a flow diagram of method steps for generating coalesced memory access requests, according to one embodiment of the invention. Although the method steps are described in conjunction with the systems for FIGS. 1-3, persons skilled in the art will understand that any system that performs the method steps, in any order, is within the scope of the invention.

As shown, the method 500 begins at step 502, where the core interface 303 receives a read application request (i.e., an application request that does not involve writing data to the global memory 320) initiated by an application program. At step 504 the core interface 303 selects an available pending request table entry in the pending request table (PRT). The core interface 303 may select this PRT entry in any technically feasible fashion, such as by selecting the lowest numbered PRT entry that is currently unused. At step 506, the core interface 303 generates a memory access request to service the lowest numbered active thread in the application request and sets the PRT entry ID included in the memory access request to correspond to the selected PRT entry. More specifically, the core interface 303 sets the request size to the maximum memory request size and sets the base address to align with the memory fetch size. For example, if the PRT entry ID were 11, the memory fetch size were 128B, the maximum memory request size were 128B, and the memory access address of the lowest numbered active thread were 812B, then the core interface 303 would generate a memory access request associated with the lowest numbered active thread with a PRT entry ID of 11, a request size of 128B, and a base address of 768B (an integer multiple of 128B). Consequently, the memory access request associated with the lowest numbered active thread would define a memory region 768B-896B.

At step 508, the core interface 303 identifies all other active threads in the application request that have associated memory access addresses located within the memory region defined by the memory access request associated with the lowest numbered active thread. For example, if the memory access request associated with the lowest numbered active thread were to define a memory region 768B-896B, then the core interface 303 would evaluate all of the other active threads in the application request to determine whether any of the associated memory access addresses are located within the memory region 768B-896B defined by the memory access request associated with the lowest numbered active thread. At step 509, the core interface 303 examines the spread of the memory access addresses in the memory region defined by the memory access request associated with the lowest numbered active thread. At step 510, if the core interface 303 determines that the memory access addresses of all of the active threads located in the memory region defined by the memory access request associated with the lowest numbered active thread are located within either the lower half or the upper half of the memory region defined by the memory access request associated with the lowest numbered active thread, and the request size is greater than the minimum memory request size, then the method 500 proceeds to step 511. At step 511, the core interface 303 modifies the memory access request associated with the lowest numbered active thread to halve the size of the memory region defined by the memory access request associated with the lowest numbered active thread, and the method 500 returns to step 509. Again, at step 509, the core interface 303 examines the spread of the memory access addresses located in the memory region defined by the modified memory access request associated with the lowest number active thread. If, at step 510, the core interface 303 determines that the memory access addresses of all of the active threads located in the memory region defined by the memory access request associated with the lowest numbered active thread span both halves of the memory access request associated with the lowest numbered active thread, or the request size is less than or equal to the minimum memory request size, then the method 500 proceeds to step 512.

For example, suppose that the memory access request associated with the lowest numbered active thread were to have a request size of 128B and a base address of 768B. Further, suppose that the application request were to include only one active thread with a memory access address within this memory region (i.e., 768B-896B), and this memory access address were to equal 812B. Finally, suppose that the minimum memory request size were to equal 32B. As part of step 510, the core interface 303 would determine that all of the memory access addresses that were within the memory region 768B-896B were also within the lower half (i.e., 768B-832B) of the memory region. Consequently, the core interface 303 would set the base address of the memory access request associated with the lowest numbered active thread to 768B and would set the request size of the memory access request associated with the lowest numbered active thread to 64B. Still as part of step 510, the core interface 303 would then determine that all of the memory access addresses that were within the updated memory region 768B-832B were also within the upper half (i.e., 800B-832B) of the updated memory region. Consequently, the core interface 303 would set the base address of the memory access request associated with the lowest numbered active thread to 800B and would set the request size of the memory access request associated with the lowest numbered active thread to 32B. The core interface would then determine that 32B was equal to the smallest request size, and the method 500 would proceed to step 512.

At step 512, the core interface 303 updates the selected PRT entry by incrementing the number of pending memory access requests included in the selected PRT entry by one, and by calculating and storing an offset from the base address for each active thread in the memory region defined by the memory access request associated with the lowest number active thread. For example, if the memory region defined by the memory access request associated with the lowest number active thread were 800B-832B, and the only active thread in this defined memory region were to have a thread ID of C and a memory access address of 812B, then the core interface 303 would set the offset corresponding to the thread ID C in the PRT entry to 12 (812B-800B).

At step 514, the core interface 303 updates the memory access request associated with the lowest numbered active thread by setting the thread mask to specify the thread IDs of all of the threads serviced in the memory access request associated with the lowest numbered active thread. For example, if the memory access request associated with the lowest numbered active thread were to service only one thread, and that thread were to have a thread ID of C, then the core interface 303 would set the thread mask to 0x1000. At step 516, the core interface 303 transmits the memory access request associated with the lowest numbered active thread to the memory interface 214 and marks all of the threads that are serviced in the memory access request associated with the lowest numbered active thread as inactive. At step 516, if the core interface 303 determines that there are any active threads remaining in the application request, then the method 500 returns to step 506, where the core interface 303 generates a memory access request associated with the lowest number active thread. The method 500 continues to execute steps 506 through 518, generating memory access requests associated with the lowest numbered active thread and marking the threads that are serviced in the memory access request associated with the lowest numbered active thread as inactive until the core interface 303 determines that there are no more active threads in the application request. In other words, the core interface 303 continues to generate memory access requests until each of the originally active threads in the application request is serviced by a particular memory access request. Again, a particular memory access request may service more than one thread, but each thread is only serviced by only one memory access request. If, at step 516, the core interface 303 determines that there are no active threads remaining in the application request, then the method 500 terminates.

In some embodiments, the core interface 303 optimizes the handling of collisions in which the memory access addresses associated with the threads in the thread group corresponding to a particular application request are identical. A particular application request may represent a read collision in which the memory instruction that is represented by the application request reads data using the memory interface 214 but does not write data using the memory interface 214. If a particular application request represents a read collision, then the core interface 303 generates one memory access request and broadcasts the data returned by the memory access request to all of the active threads in the application request.

A particular application request may represent a write collision in which the memory instruction that is represented by the application request writes data using the memory interface 214 but does not read data using the memory interface 214. If a particular application request represents a write collision, then the core interface 303 generates one memory access request corresponding to one active thread and discards all of the other threads in the application request. The core interface 303 may choose the active thread that is serviced by the memory access request in any technically feasible fashion, such as choosing the highest numbered active thread based on the thread IDs.

Finally, a particular application request may represent an atomic read-modify-write collision in which the memory instruction that is represented by the particular application request reads data using the memory interface 214, modifies the data, and writes the modified data using the memory interface 214. Each atomic read-modify-write access to a given address should complete before another access to the same address proceeds. If a particular application request represents an atomic read-modify-write collision, then the core interface 303 generates a series of sequential memory access requests, one memory access request corresponding to each active thread in the application request.

Figure 6:
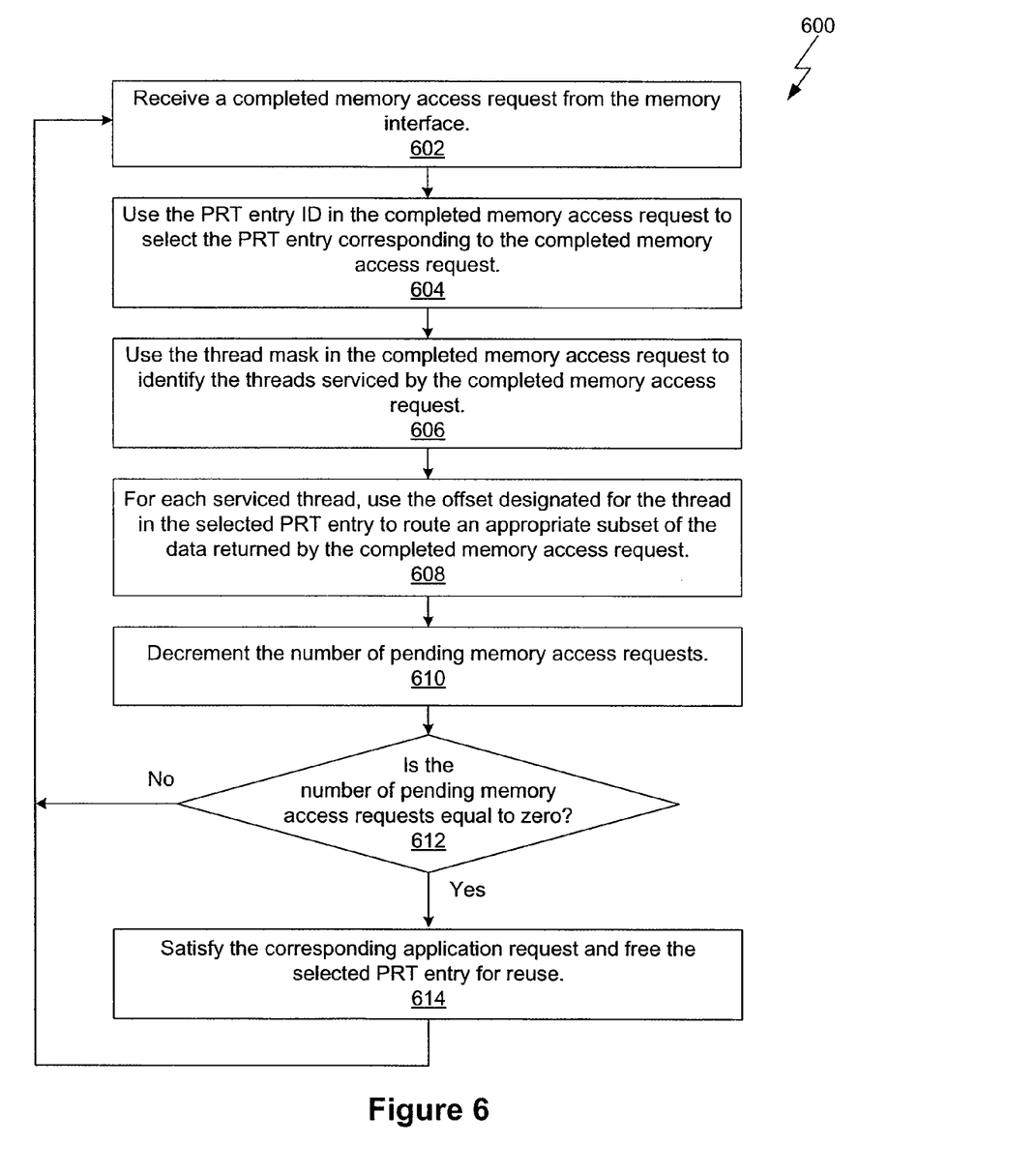
FIG. 6 is a flow diagram of method steps for routing completed coalesced memory access requests, according to one embodiment of the invention.

FIG. 6 is a flow diagram of method steps for routing completed coalesced memory access requests, according to one embodiment of the invention. Although the method steps are described in conjunction with the systems for FIGS. 1-3, persons skilled in the art will understand that any system that performs the method steps, in any order, is within the scope of the invention.

As shown, the method 600 begins at step 602, where the core interface 303 receives a completed memory access request from the memory interface 214. At step 604, the core interface 303 uses the PRT entry ID included in the completed memory access request to select the PRT entry in the PRT that corresponds to the completed memory access request. At step 606, the core interface 303 uses the thread mask included in the completed memory access request to identify the threads that are serviced by the completed memory access request. At step 608, for each of the serviced threads, the core interface 303 uses the offset designated for the particular thread in the selected PRT entry to route the appropriate subset of the data that is returned by the memory access request. Note that some memory access requests do not return data (such as a memory access request that corresponds to an unacknowledged write application request), and therefore the core interface 303 only performs step 608 for the subset of memory access requests that return data.

At step 610, the core interface 303 decrements the number of pending memory access requests included in the selected PRT entry by one. At step 612, if the core interface 303 determines that the number of pending memory access requests included in the selected PRT entry is not equal to zero, then the method 600 returns to step 602, where the core interface 303 receives another completed memory access request. If, at step 612, the core interface 303 determines that the number of pending memory access requests included in the selected PRT entry is equal to zero, then the method 600 proceeds to step 614. At step 614, the core interface 303 satisfies the application request corresponding to the selected PRT entry, and frees the selected PRT entry for reuse. In some embodiments, as part of satisfying the corresponding application request, the core interface 303 may transmit the assembled return data corresponding to the selected PRT entry to the appropriate application program. The method 600 then continues to execute steps 602 through 614, processing completed memory access requests and satisfying application requests.

In sum, the core interface may increase the efficiency of memory accesses for a thread group by identifying and exploiting opportunities to generate memory access requests that service two or more threads in the thread group. More specifically, the core interface combines individual thread access requests for small memory words into fewer requests for large memory blocks. In one embodiment, the core interface receives an application request that includes memory access requests for a thread group from an application program. First, the core interface identifies an unused entry in the pending request table (PRT) and modifies the PRT entry to track the memory access requests and enable the routing of data to the appropriate threads. The core interface then repeatedly forms memory access requests that service one or more threads in the thread group until each of the active threads in the thread group are included in one of the memory access requests. More specifically, the core interface repeatedly identifies the lowest numbered active thread in the thread group; identifies any other active threads in the thread group that lie within the maximum-sized, aligned memory region that includes the lowest active thread; and creates a new memory access request to service the identified threads. In the best case, the core interface generates one memory access request for the application request. In the worst case, the core interface generates a memory access request for each of the active threads in the application request.

Advantageously, using the disclosed techniques, the core interface optimizes the efficiency of memory accesses for each thread group and, consequently, the performance of the parallel processing subsystem. More specifically, these techniques enable the parallel processing subsystem to execute high-efficiency coalesced memory accesses for thread groups that do not access large contiguous blocks on aligned block boundaries. For example the core interface may optimize the performance of memory traffic patterns such as accessing sequential elements that are not on block boundaries, collisions (identical addresses), strided accesses (accessing non-contiguous memory with increasing addresses), and others. Further, the parallel processing subsystem may coalesce such memory accesses in existing, non-optimized application programs. In other words, application developers do not need to incorporate any special knowledge (e.g., memory fetch size, etc.) into application programs to facilitate these highly-efficient coalesced memory accesses. Consequently, the disclosed techniques not only ensure that the number of memory requests is minimized and, therefore, the performance of application programs (that read and write memory) is increased, but also make the application programs easier to develop. Further, although the core interface may generate a different number of memory requests to service each application request, the core interface enables the use of a single PRT entry for each application request by including the appropriate PRT entry ID in each memory request. Finally, requests to the same address are collapsed as much as is technically feasible.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

We claim:

1. A method for generating a coalesced memory access operation for a thread group based on an application request, the method comprising:
   receiving a memory access request from the application to be carried out by a plurality of active threads in the thread group;
   selecting an available entry in a pending request table (PRT) for the memory access request from the application;
   generating a first memory access request for a first active thread having a maximum size that defines a first memory region for the first memory access request;
   identifying one or more additional active threads that have associated memory access addresses located within the first memory region; and
   setting a thread mask to specify that the first active thread and the one or more additional active threads carry out the first memory access request to provide data to threads specified by the thread mask.

2. The method of claim 1, further comprising the step of determining whether the memory access addresses associated with the one or more additional active threads are located in only one half of the first memory region.

3. The method of claim 2, further comprising the step of halving the first memory region, at least once, to generate an updated memory region associated with the first memory access request, wherein the memory access addresses associated with the one or more additional active threads span both halves of the updated memory region.

4. The method of claim 1, further comprising the step of incrementing a count related to the number of memory access requests associated with the plurality of active threads.

5. The method of claim 4, further comprising the step of storing an offset for each of the first active thread and the one or more additional active threads.

6. The method of claim 5, further comprising the step of transmitting the first memory request to a memory interface for processing.

7. The method of claim 6, further comprising the step of updating the active mask to mark the first active thread and the one or more active threads as inactive.

8. The method of claim 7, further comprising the steps of:
   determining whether the updated active mask indicates that one or more threads in the thread group are active; and
   if the updated active mask indicates that one or more threads in the thread group are active, then:
   generating a second memory access request for a second active thread having a maximum size that defines a second memory region for the second memory access request,
   identifying any other active threads in the thread group that have associated memory access addresses located within the second memory region, and
   setting a thread mask to specify that the second active thread and the any other active threads carry out the second memory access request.

9. The method of claim 1, wherein the first memory region is defined by a memory access address associated with the first active thread and a memory fetch size.

10. The method of claim 1, wherein the memory access request from the application comprises a read request, and each active thread in the plurality of the active threads in the thread group have identical associated memory access addresses.

11. The method of claim 10, further comprising the step of broadcasting data accessed by the first active thread in carrying out the first memory access request to each of the one or more additional active threads.

12. A computer-readable storage medium including instructions that, when executed by a processing unit, cause the processing unit to generate a coalesced memory access operation for a thread group based on an application request, by performing the steps of:
   receiving a memory access request from the application to be carried out by a plurality of active threads in the thread group;
   selecting an available entry in a pending request table (PRT) for the memory access request from the application;
   generating a first memory access request for a first active thread having a maximum size that defines a first memory region for the first memory access request;
   identifying one or more additional active threads that have associated memory access addresses located within the first memory region; and
   setting a thread mask to specify that the first active thread and the one or more additional active threads carry out the first memory access request to provide data to threads specified by the thread mask.

13. The computer-readable storage medium of claim 12, further comprising the step of determining whether the memory access addresses associated with the one or more additional active threads are located in only one half of the first memory region.

14. The computer-readable storage medium of claim 13, further comprising the step of halving the first memory region, at least once, to generate an updated memory region associated with the first memory access request, wherein the memory access addresses associated with the one or more additional active threads span both halves of the updated memory region.

15. The computer-readable storage medium of claim 12, further comprising the step of incrementing a count related to the number of memory access requests associated with the plurality of active threads.

16. The computer-readable storage medium of claim 15, further comprising the step of storing an offset for each of the first active thread and the one or more additional active threads.

17. The computer-readable storage medium of claim 16, further comprising the step of transmitting the first memory request to a memory interface for processing.

18. The computer-readable storage medium of claim 17, further comprising the step of updating the active mask to mark the first active thread and the one or more active threads as inactive.

19. The computer-readable storage medium of claim 18, further comprising the steps of:
   determining whether the updated active mask indicates that one or more threads in the thread group are active; and
   if the updated active mask indicates that one or more threads in the thread group are active, then:
      generating a second memory access request for a second active thread having a maximum size that defines a second memory region for the second memory access request,
      identifying any other active threads in the thread group that have associated memory access addresses located within the second memory region, and
      setting a thread mask to specify that the second active thread and the any other active threads carry out the second memory access request.

20. The computer-readable storage medium of claim 12, wherein the first memory region is defined by a memory access address associated with the first active thread and a memory fetch size.

21. The computer-readable storage medium of claim 12, wherein the memory access request from the application comprises a read request, and each active thread in the plurality of the active threads in the thread group have identical associated memory access addresses.

22. The computer-readable storage medium of claim 21, further comprising the step of broadcasting data accessed by the first active thread in carrying out the first memory access request to each of the one or more additional active threads.

23. A computing device, comprising:
   a memory; and
   a parallel processing unit that includes:
      a plurality of processing engines across which a group of threads executes in parallel, and
      a core interface configured to:
         receive a memory access request from the application to be carried out by a plurality of active threads in the thread group,
         select an available entry in a pending request table (PRT) for the memory access request from the application,
         generate a first memory access request for a first active thread having a maximum size that defines a first memory region for the first memory access request,
         identify one or more additional active threads that have associated memory access addresses located within the first memory region, and
         setting a thread mask to specify that the first active thread and the one or more additional active threads carry out the first memory access request to provide data to threads specified by the thread mask.

\* \* \* \* \*